United States Patent [19]

Agari

[11] Patent Number: 5,356,223
[45] Date of Patent: Oct. 18, 1994

[54] LINEAR MOTION ROLLING GUIDE UNIT

[75] Inventor: Norimasa Agari, Seki, Japan

[73] Assignee: Nippon Thompson Co., Ltd., Tokyo, Japan

[21] Appl. No.: 162,267

[22] Filed: Dec. 7, 1993

[30] Foreign Application Priority Data

Dec. 10, 1992 [JP] Japan .................. 4-090441[U]

[51] Int. Cl.5 .............................................. F16C 29/06
[52] U.S. Cl. ........................................ 384/15; 384/45
[58] Field of Search ..................... 384/15, 43, 44, 45

[56] References Cited

U.S. PATENT DOCUMENTS

| 5,080,498 | 1/1992 | Tsukada | 384/15 |
| 5,087,130 | 2/1992 | Tsukada | 384/15 |
| 5,149,205 | 9/1992 | Tsukada | 384/15 |
| 5,209,575 | 5/1993 | Ohtake | 384/15 |

FOREIGN PATENT DOCUMENTS 1212201991 12/1991 Japan .
447251993 2/1993 Japan .

Primary Examiner—Thomas R. Hannon
Attorney, Agent, or Firm—Browdy and Neimark

[57] ABSTRACT

The linear motion rolling guide unit permits the under seals to be mounted or dismounted easily to and from the end caps without causing deformations such as buckling to the under seal or requiring high precision machining. Projections with locking portions are provided to the undersides of the end caps and a half of each of the projections is cut away to make the projections elastically deformable. The under seal is formed with insertion holes for receiving the projections. The opposing longitudinal edges of each insertion hole are formed with locking detents at positions longitudinally offset or staggered. By elastically deforming the projections and inserting them into the insertion holes and then engaging the locking portions with the locking detents, the under seals can be mounted firmly to the end caps.

6 Claims, 3 Drawing Sheets

LINEAR MOTION ROLLING GUIDE UNIT

BACKGROUND OF THE INVENTION

1. Field of the Invention

The present invention relates to a linear motion rolling guide unit, which is applied to a variety of relatively moving portions in machine tools and testing equipment and in which a slider is mounted slidable on a track rail with rolling elements interposed therebetween.

2. Description of the Prior Art

In conventional linear motion rolling guide units, the sealing between a track rail and a slider that slides on it is realized by end seals attached to the ends of the slider and under seals attached to the underside of the slider.

The conventional linear motion rolling guide unit, as shown in FIG. 5, comprises a track rail 1 having raceway grooves 9 formed longitudinally on both side walls 12 thereof, and a slider 22 slidably mounted astride the track rail 1. The slider 22 includes a casing 2, which is slidable relative to the track rail 1 and has raceway grooves 8 formed at positions facing the raceway grooves 9 on the track rail 1, a number of balls 4 or rolling elements trapped between the opposing raceway grooves 8 and 9 to allow relative motion between the rail and the casing, and end caps 5 attached to the longitudinal ends of the casing, the longitudinal direction being the sliding direction of the casing 2.

The end cap 5 has an end seal 21 that provides the sealing between the track rail 1 and the slider 22. The casing 2 is provided with under seals 3 for sealing between the casing 2, the longitudinal side wall surfaces 12 of the track rail 1, and the underside of the casing 2.

The slider 22 is mounted astride on the track rail 1 and freely slidable relative to it through a number of balls 4 circulating along the raceway grooves 9 in the track rail 1. The large number of balls 4 are led into a raceway 24 formed between the raceway groove 9 of the track rail 1 and the raceway groove 8 of the casing 2, into a direction changing passage (at 26 in FIG. 3) formed in the end cap 6 and further into a return passage 25 formed parallel to the raceway groove 8 in the casing 2, so that the rolling elements 4 circulate in an endless raceway.

The under seal 3, though it has an advantage of being simple in construction and easily manufactured, also has drawbacks that because the under seal 3 is thin, it is easily deformed by external forces and by positional errors between it and the casing 2 and track rail 1, the casing and track rail having the raceway grooves 8, 9 respectively. Hence, the under seal 3, which is subjected to temperature variations and exposed to lubricants as the slider 22 slides on the track rail 1, might swell and be deformed deteriorating the sealing performance.

Furthermore, when the under seal 3 in the conventional linear motion rolling guide unit is formed of plastics and put in operation for a long period of time, it may be swelled by soaking lubricants. In that case, because the under seal 3 is fixed at its ends to the metallic casing 2 as by screws, it cannot move relative to the casing 2 and is thus deformed. When the under seal 3 is deformed, the contact condition or sealing condition between the under side of the casing 2 and the upper surface of the under seal 3 deteriorates, even deforming the sealing portion. In the conventional linear motion rolling guide unit, when the contact condition between the sealing portion and the side wall surfaces 12 of the track rail 1 deteriorates, the sealing performance, particularly, the capability of preventing foreign substances such as dust from entering the raceways is degraded.

As an example device that tackles the above problem, a linear motion guide bearing disclosed in the Japanese Utility Model No. 121220/1991 may be cited. An under seal device of the linear motion guide bearing has two-pronged projections protruding toward the underside of the slider, the two prongs being undulated in the direction of axis of the under seal and elastically deformable toward each other. The slider has the axial end portions of the underside thereof formed with vertical holes, into which the two-pronged projections of the under seal are fitted, and also with through-holes that intersect the vertical holes perpendicularly and pass through the arm or wing portions of the slider. The two-pronged projection of the under seal is engaged in the through-holes.

Another linear motion rolling guide unit to solve the above problem is disclosed in the Japanese Patent Laid-Open No. 44725/1993. This linear motion rolling guide unit has an engagement portion formed at least at one longitudinal end of the under seal and an engagement hole formed in the underside of the end cap for slidably receiving the engagement portion.

The applicant of this invention previously developed a linear motion rolling guide unit and filed an application for a patent (Japanese Utility Model No. 63565/1992). The previously developed linear motion rolling guide unit is constructed as follows. An under seal comprises a core member made of metal and an elastic sealing member having lip portions secured to the core member. A pair of projections having locking portions are provided to the underside of the end caps in such a way that they extend longitudinally and are spaced apart widthwise from each other. The core member is formed with longitudinally elongate engagement holes whose opposing longitudinal edges are formed as locking detents. The locking portions are elastically deformed to engage the locking detents thereby mounting the under seal to the end caps.

In the above conventional linear motion rolling guide unit, the under seal, though it is simple in construction and easy to manufacture, has problems that the under seal will easily develop positional errors with respect to the casing and track rail having the raceway grooves, that the mounting is not simple, and that it is easily deformed by swelling, thermal stresses or external forces. Over a long period of use, the lip portion that slides in contact with the side wall surfaces of the track rail will be worn out, making the adjustment of the under seal impossible. This requires replacing the under seal to restore a good sealing condition. In this way, the under seal of the conventional linear motion rolling guide unit needs improvements in terms of sealing performance and durability.

Further, with the conventional linear motion rolling guide unit, to improve the sealing performance requires accurate positioning of the locking piece and engagement hole in the mounting portion between the under seal and the end cap. It is also complex and difficult to mount and dismount the under seal to and from the end cap. Another disadvantage of the conventional linear motion rolling guide unit is that when the lip portion of the under seal that is in contact with the side wall surfaces of the track rail is worn out, the engagement condition of the lip portion cannot be adjusted, requiring the under seal to be replaced.

SUMMARY OF THE INVENTION

A primary objective of this invention is to solve the above-mentioned problems and to provide a linear motion rolling guide unit, in which the under seals for sealing the side wall surfaces of the track rail and the undersides of the casing and end caps can be mounted or dismounted easily to or from the end caps, by providing projections to the end caps rather than forming engagement holes in the end caps, and inserting or pulling out the projections into or from the insertion holes formed in the under seals by elastically deforming the projections; and in which the machining errors of the insertion holes in the under seals and of the projections of the end caps can be tolerated, the position of the under seals can be adjusted in the longitudinal direction of the end caps, and the under seals do not develop deformations such as buckling even when the under seals are expanded or contracted as by swelling due to lubricants or thermal stresses.

A further objective of this invention is to provide a linear motion rolling guide unit which comprises:
- a track rail having raceway grooves formed on longitudinally extending side wall surfaces thereof;
- a casing slidable relative to the track rail and having second raceway grooves formed at positions facing the first raceway grooves on the track rail;
- end caps mounted to the longitudinal ends of the casing;
- rolling elements rolling and circulating through raceways formed between the opposing raceway grooves;
- under seals made up of core members and elastic members having lip portions; and
- projections protruding from the undersides of the end caps, each of the projections extending parallel to the track rail and having locking portions which protrude widthwise from and on both sides of the projection and engage the under seals;
- wherein the projections each have their longitudinal length partly cut away to a certain depth to form a notch;
- wherein the core member is formed with insertion holes to receive the projections;
- wherein opposing longitudinal edges of each of the insertion holes are formed with locking detents at positions longitudinally offset or staggered; and
- wherein the under seals are mounted to the end caps by engaging the locking portions with the locking detents.

The projections formed on the end caps are fitted into the insertion holes in the core members to mount the under seals to the end caps. To be described in more detail, this mounting process consists of the following steps: elastically deforming the notched portion of the projections in the lateral or width direction; fitting into the insertion holes the undeformed portion of the projections which is on the side longitudinally opposite the notched portion; engaging one of the locking portions of the projections on the undeformed side with one of the locking detents formed at the edges of the insertion holes; and releasing an elastically deforming force from the projections to let them snap back to their original shape and thereby elastically engage the other locking portion of the projections with the other locking detent at the insertion hole edge by the snap action.

At least one of the locking detents, which are formed at the edges of the insertion holes, protrudes inwardly of the insertion holes, so that the insertion holes have a deformed shape with its lateral length varying over the longitudinal length. It is therefore possible to fit the projections of the end caps into the insertion holes easily.

On the upper surface of the core member of the under seal on the track rail side of the insertion hole is provided a bulge which is made of the same material as the elastic member of the under seal and which bears elastically on the underside of the end cap. Hence, the reactionary force of the bulge pushes back the under seal away from the end cap, causing the locking portions of the projection provided to the end cap to resiliently engage the locking detents of the core member, thus vertically positioning the under seal with respect to the end cap reliably and firmly.

The projection comprises a projection body extending parallel to the track rail and locking portions protruding widthwise from and on both sides of the projection body. The lateral length of the insertion hole is set longer than that of the projection body so as to allow elastic deformation of the projection of the end cap in the lateral direction.

The projection has a part of its longitudinal length cut away to a certain depth to form a notch, so that by elastically deforming the projection in the lateral or width direction the projection can easily be fitted into the insertion hole, permitting the locking portions to engage the locking detents easily. Thus the under seal can be mounted to the end cap very easily. In removing the under seal from the end cap, a procedure reverse to what has been described above is followed, which consists in: elastically deforming the notched portion of the projection; disengaging the locking portions on the notched side from the detents of the under seal; and pulling the under seal from the end cap.

The locking detents at the insertion hole edges in the under seal are engaged with the locking portions of the projection formed on the end cap. The locking detents have a free end protruding inwardly of the insertion hole, which can be deformed slightly for angular adjustment.

Since the longitudinal length of the insertion hole is set greater than that of the projection, the under seal can be adjusted in longitudinal position with respect to the end cap, making it possible to accommodate machining errors that may occur with each member.

Because the under seal is movable longitudinally relative to the end cap, machining errors of the under seals and the end caps can be tolerated during their assembly, lowering the level of machining precision required of the parts and therefore the manufacturing cost. When the under seal is thermally expanded or contracted or swelled by lubricants, it is allowed to move freely according to its expansion or contraction and is prevented from being deformed as by buckling or strain. The under seal therefore can be kept in a good sealing condition with respect to the casing, end caps and track rail, sealing the circulating passage of the rolling elements and preventing foreign substances such as dust from entering.

By stuffing an elastic member in a gap around the projections protruding from the end caps and between the projections and the core members of the under seals, the area near the projections can be sealed against foreign substances. When the under seal is expanded or contracted by temperature changes or by swelling due to lubricants, the under seal is allowed to expand or contract and is thus prevented from being deformed by buckling or strain. Therefore, the under seal can reliably seal the circulating passage of the rolling elements and prevent ingress of foreign matters such as dust. When the lip portions of the under seal are worn out over a long period of use, the under seal can be shifted toward the track rail for the adjustment of the lip portions by changing the amount of elastic member stuffed around the projection.

DETAILED DESCRIPTION OF THE EMBODIMENT

Figure 1:
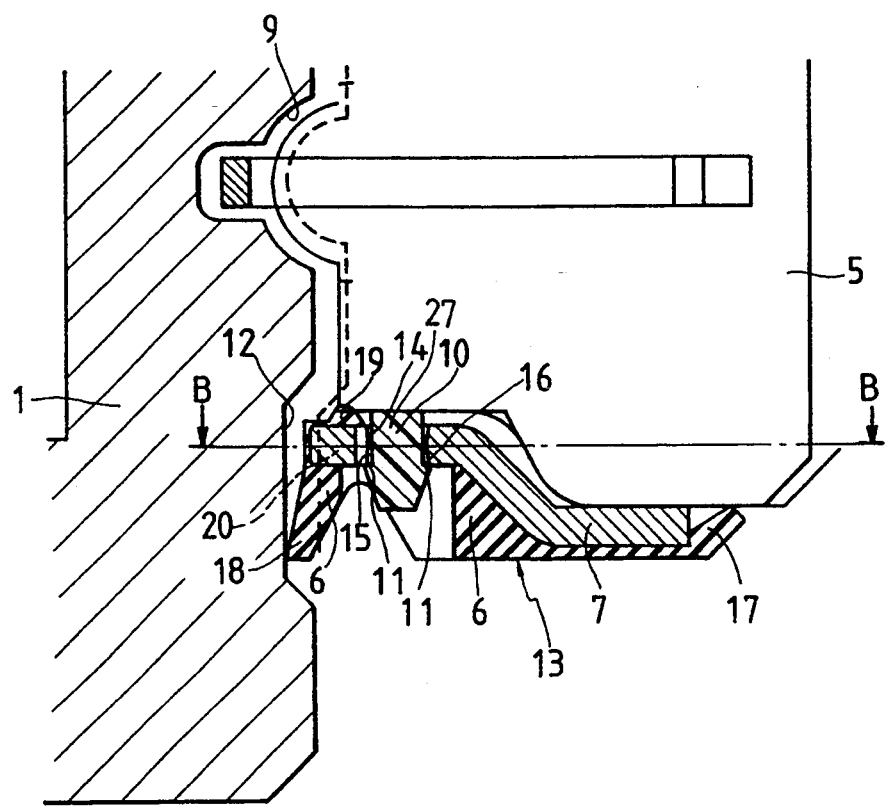
FIG. 1 is a schematic cross section of a linear motion rolling guide unit embodying the present invention, taken along the line A—A of FIG. 2.

Now, by referring to the attached drawings, one embodiment of the linear motion rolling guide unit according to this invention will be described. In FIGS. 1, 2, 3 and 4 components having the same functions or actions as those in FIG. 5 are assigned like reference numerals.

Figure 5:
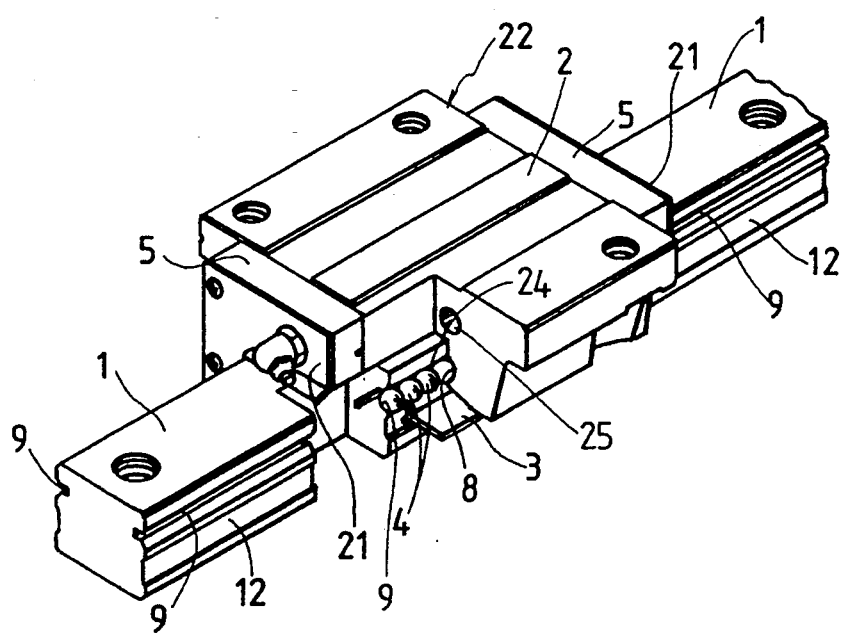
FIG. 5 is a perspective view of a conventional linear motion rolling guide unit.

The linear motion rolling guide unit of this invention is basically the same in construction as the linear motion rolling guide unit of FIG. 5 and is characterized in the mounting structure of the under seal 3, i.e. the under seal 13 of FIG. 1.

Like the construction shown in FIG. 5, the linear motion rolling guide unit of this invention includes: a track rail 1 having raceway grooves 9 extending longitudinally on both side wall surfaces thereof; and a slider 22 slidably mounted on the track rail 1. The slider 22 is slidable relative to the track rail 1 and has a casing 2, which is formed with raceway grooves 8 at positions facing the raceway grooves 9; a number of balls or rolling elements 4 circulating through a raceway defined by the opposing raceway grooves 8 and 9 to allow relative motion of the slider 22 and the track rail 1; end caps 5 attached to the longitudinal ends of the casing 2; end seals 21 attached to the end surfaces of the end caps 5; and under seals 13 attached to the end caps 5.

The end caps 5 are mounted to the end surfaces of the casing 2 by passing two or more screws through mounting holes formed therein. The inside of the end cap 5 is formed with direction changing passages on both sides for changing the direction of travel of the balls 4 so that they can circulate endlessly in the raceways between the casing 2 and the track rail 1. The end cap 5 is formed with a rail accommodating recess through which it straddles the track rail 1.

The end cap 5 has a projection 10 protruding from the underside thereof downwardly parallel to the track rail 1 so that the under seal 13 can be mounted on the projection 10. The projection 10 consists of a projection body 27 extending parallel to the track rail 1 and locking portions 11 protruding widthwise from and on both sides of the projection body 27. That is, at both sides, widthwise, of the projection body 27 is formed the locking portions 11 that engages with locking detents 15, 16 of an insertion hole 14 formed in the under seal 13. In FIG. 1, the projection 10 is shown to be formed integral with the end cap 5. The projection 10 may also be formed separate and thereafter combined together with the end cap 5.

Figure 2:
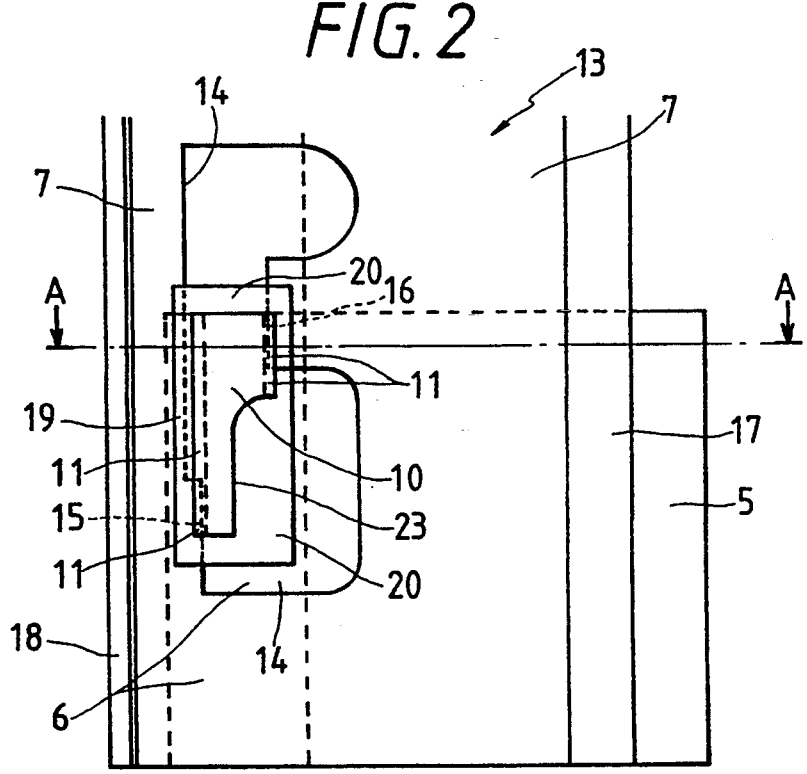
FIG. 2 is a cross section taken along the line B—B of FIG. 1.
Figure 3:
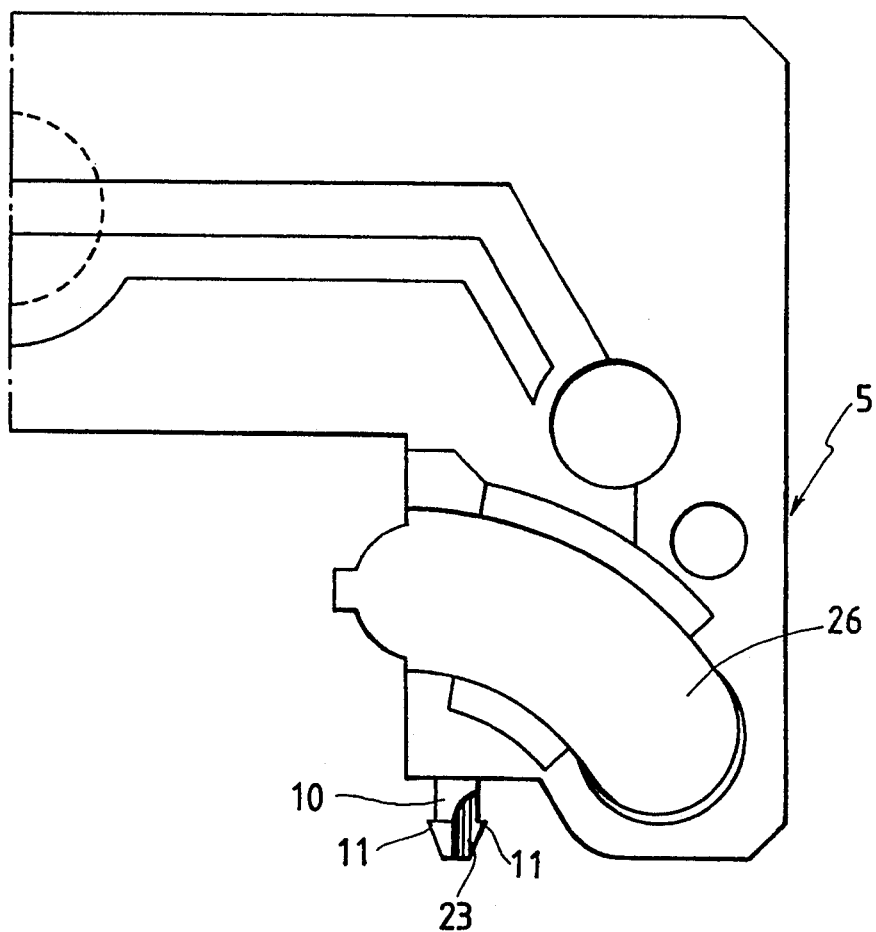
FIG. 3 is a schematic end view showing a part of the end surface of the end cap.
Figure 4:
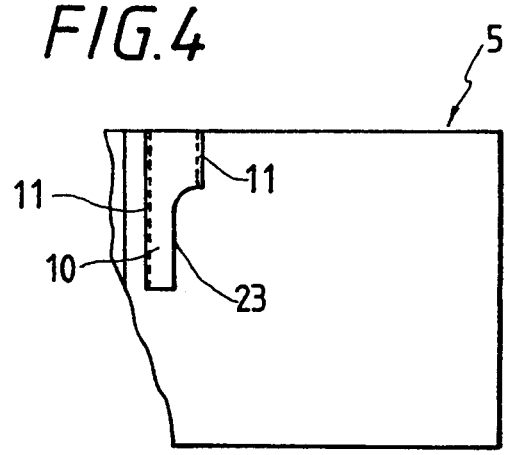
FIG. 4 is a bottom view of the underside of the end cap.

When the projection 10 is made of a material that does not easily undergo elastic deformation, the locking portions 11 cannot easily be locked since the thickness of the locking portions 11 is larger than the distances between the locking detents 15 and 16 in the conventional structure. For this reason, it is preferred that a longitudinal half of the projection 10 be formed in such a construction as will easily deform elastically. For instance, as shown in FIG. 2, the projection 10 may be partly cut away over a specified longitudinal length and to a depth in a width direction to form a notch 23. Alternatively, the projection 10 may be formed with a vertical cut along the center to make it two-pronged and therefore easily elastically deformable.

The under seal 13 includes a core member 7 made of a metallic material such as steel, and an elastic member 6 made of such materials as rubber and plastic with elasticity and fixedly secured to the core member 7. The elastic member 6 has a lip portion 17 that can be brought into sealing contact with the undersides of the casing 2 and the end cap 5 and another lip portion 18 that can be brought into sealing contact with the side wall surface 12 of the track rail 1.

On the upper surface of the core member 7 of the under seal 13 is provided a bulge 19 made of the same material as the elastic member 6 which bears resiliently on the underside of the end cap 5 when the under seal 13 is mounted to the end cap 5, i.e. when the projection 10 of the end cap 5 fits into the insertion hole 14 of the under seal 13 with the locking portions 11 engaged with the locking detents 15, 16. Hence, the under seal 13 is pushed back from the end cap 5 by the elastic force of the bulge 19, causing the locking portions 11 of the projection 10 on the end cap 5 to resiliently engage the locking detents 15, 16 formed at the edges of the insertion hole in the core member 7. As a result, the under seal 13 is firmly and reliably positioned in the vertical direction with respect to the end cap 5. In the figure, the bulge 19 is shown to be formed near the edge of the insertion hole 14 on the side of the track rail 1. It may also be formed partly at the edge of the insertion hole.

The core member 7 of the under seal 13 is formed with an insertion hole 14 of a non-circular, deformed shape to receive the projection 10 of the end cap 5. At the longitudinal peripheral portions of the insertion hole 14, i.e. the edges of the hole, are formed the locking detents 15, 16 that are engaged by the locking portions 11 of the projection 10. These locking detents 15, 16 are formed integral with the core member 7 in such a manner that they do not face each other but are staggered. If at least one 16 of the locking detents 15, 16 is formed protruding inwardly from one of the long edges of the insertion hole 14, the inwardly protruding locking detent can be deformed during the process of machining the core member 7 to secure a precise width dimension of the insertion hole 14. By slightly bending the locking detents 15, 16 in the vertical direction, it is possible to accommodate dimensional errors with respect to the locking portions 11 of the projection 10.

The insertion hole 14 in the core member 7 is preferably formed larger than the projection 10 to make it easy to attach and detach the under seal 13 to and from the end cap 5. Particularly for allowing the longitudinal positional adjustment of the under seal 13 with respect to the end cap 5, the longitudinal length of the insertion hole 14 is set larger than that of the projection 10. Further, to allow for elastic deformation of the projection 10 of the end cap 5 in the direction of width, the lateral length of the insertion hole 14 is set larger than that of the projection 10.

Since the insertion hole 14 is formed larger than the projection 10 and has no elastic member 6, a gap between the insertion hole 14 and the projection 10 is filled with an elastic member 20 to seal the portion around the projection 10, thus preventing ingress of foreign substances such as dust. In addition, by adjusting how the elastic member 20 that seals the gap between the insertion hole 14 and the projection 10 is stuffed, it is possible to adjust the distance between the track rail 1 and the under seal 13, i.e. the preloaded pressure applied to the lip portion 18 of the under seal 13 in sliding contact with the side wall surface 12 of the track rail 1.

The linear motion rolling guide unit of this invention is constructed as described above. It is, however, noted that the guide unit is not limited to the above embodiment but may have various modifications. Although in FIG. 1 the underside of the end cap 5 and the under seal 13 are shaped such that the projection 10 is shown provided in an undercut portion of the end cap 5 to secure a certain amount of gap between the bottom of the end cap and a bed on which the track rail 1 is laid, this invention can also be applied to a linear motion rolling guide unit in which the underside of the end cap 5 is formed flat and the under seal 13 is shaped like a flat plate.

I claim:

1. A linear motion rolling guide unit comprising:
   a track rail having first raceway grooves formed on longitudinally extending side wall surfaces thereof;
   a casing slidable relative to the track rail and having second raceway grooves formed at positions facing the first raceway grooves;
   end caps mounted to the longitudinal ends of the casing;
   rolling elements rolling and circulating through raceways formed between the first raceway grooves and the second raceway grooves;
   under seals made up of core members and elastic members secured to the core members, the elastic members having lip portions for sealing the track rail, the casing and the end caps; and
   projections protruding from the undersides of the end caps, each of the projections having a projection body extending parallel to the track rail and locking portions protruding widthwise from and on both sides of the projection body;
   wherein the projections each have their longitudinal length partly cut away to a certain depth to reduce the thickness in the lateral direction thereby forming a notch;
   wherein the core member is formed with insertion holes elongate in the longitudinal direction of the core member to receive the projections; and
   wherein opposing longitudinal edges of each of the insertion holes are formed with locking detents with which the locking portions of the projections are engageable, and the locking detents facing each other at both sides of each of the insertion holes are formed at positions offset or staggered longitudinally of the insertion holes.

2. A linear motion rolling guide unit according to claim 1, wherein the elastic members of the under seals have bulges bearing on the undersides of the end caps at locations close the projections.

3. A linear motion rolling guide unit according to claim 1, wherein the insertion holes have at least one of the locking detents, which are formed at the longitudinal edges of the insertion holes, protrude inwardly of the insertion holes, and the insertion holes are of a deformed shape having a lateral length varying over the longitudinal length thereof.

4. A linear motion rolling guide unit according to claim 1, wherein the longitudinal length of the insertion holes is set larger than that of the projections to allow longitudinal positional adjustment of the under seals with respect to the end caps.

5. A linear motion rolling guide unit according to claim 1, wherein the lateral length of the insertion holes is set larger than that of the projection bodies of the projections to allow elastic deformation in the lateral direction of the projections protruding from the end caps.

6. A linear motion rolling guide unit comprising:
   a track rail having first raceway grooves formed on longitudinally extending side wall surfaces thereof;
   a casing slidable relative to the track rail and having second raceway grooves formed at positions facing the first raceway grooves;
   end caps mounted to the longitudinal ends of the casing;
   rolling elements rolling and circulating through raceways formed between the first raceway grooves and the second raceway grooves;
   under seals made up of core members and elastic members secured to the core members, the elastic members having lip portions for sealing the track rail, the casing and the end caps;
   projections protruding from the undersides of the end caps, each of the projections having a projection body extending parallel to the track rail and locking portions protruding widthwise from and on both sides of the projection body;
   wherein the projections each have their longitudinal length partly cut away to a certain depth to reduce the thickness in the lateral direction thereby forming a notch;
   wherein the core member is formed with insertion holes elongate in the longitudinal direction of the core member to receive the projections;
   wherein opposing longitudinal edges of each of the insertion holes are formed with locking detents with which the locking portions of the projections are engageable, and the locking detents facing each other at both sides of each of the insertion holes are formed at positions offset or staggered longitudinally of the insertion holes; and
   wherein an elastic member for the sealing purpose is provided in a gap around the projections protruding from the end caps and between the projections and the core members of the under seals.

* * * * *